(12) United States Patent
Reusing

(10) Patent No.: US 9,915,553 B2
(45) Date of Patent: Mar. 13, 2018

(54) SAFE POSITION MEASURING APPARATUS

(71) Applicant: Robert Bosch GmbH, Stuttgart (DE)

(72) Inventor: Guenter Reusing, Niederwerm (DE)

(73) Assignee: Robert Bosch GmbH, Stuttgart, DE (US)

( * ) Notice: Subject to any disclaimer, the term of this patent is extended or adjusted under 35 U.S.C. 154(b) by 181 days.

(21) Appl. No.: 14/569,123

(22) Filed: Dec. 12, 2014

(65) Prior Publication Data

US 2015/0168349 A1 Jun. 18, 2015

(30) Foreign Application Priority Data

Dec. 17, 2013 (DE) .................. 10 2013 226 198

(51) Int. Cl.
*G01B 7/14* (2006.01)
*G01B 7/30* (2006.01)
*H01F 5/00* (2006.01)
*G01D 5/20* (2006.01)
*G01D 5/22* (2006.01)
*G01D 5/245* (2006.01)

(52) U.S. Cl.
CPC ............ *G01D 5/20* (2013.01); *G01D 5/2258* (2013.01); *G01D 5/2451* (2013.01)

(58) Field of Classification Search
CPC ........ G01D 5/20; G01D 5/2006; G01D 5/202; G01D 5/204; G01D 5/22; G01D 5/2208; G01D 5/2225; G01D 5/225; G01D 5/2258; G01D 5/2275; G01D 5/2291; G01D 5/2451; G01P 13/04

USPC .............. 324/207.11, 207.15–207.17, 207.24
See application file for complete search history.

(56) References Cited

U.S. PATENT DOCUMENTS

| 4,591,795 | A | * | 5/1986 | McCorkle | G01D 5/2208 324/207.18 |
|---|---|---|---|---|---|
| 5,162,798 | A | * | 11/1992 | Yundt | G01D 5/2451 341/115 |
| 6,011,389 | A | * | 1/2000 | Masreliez | G01D 5/2046 324/207.17 |
| 6,229,301 | B1 | * | 5/2001 | Bolli | G01B 3/205 324/207.21 |
| 6,259,249 | B1 | * | 7/2001 | Miyata | G01B 7/003 324/207.12 |
| 6,295,992 | B1 | | 10/2001 | Sapp | |
| 2002/0017902 | A1 | * | 2/2002 | Vasiloiu | G01D 5/2046 324/207.17 |
| 2004/0196026 | A1 | * | 10/2004 | Bolz | G01P 3/489 324/207.12 |

(Continued)

*Primary Examiner* — Arleen M Vazquez
*Assistant Examiner* — Steven Yeninas
(74) *Attorney, Agent, or Firm* — Maginot, Moore & Beck LLP

(57) ABSTRACT

A scanning head for scanning a material measure on which markings with a period are formed periodically in the measuring direction includes at least two individual sensors configured to produce sensor signals by scanning the markings. The scanning head further includes a digital signal processing apparatus configured to produce at least one highly accurate output signal from the sensor signals. The scanning head is configured to output at least two different types of output signals. The at least two different types of output signals comprises at least one safe output signal and the at least one highly accurate output signal.

7 Claims, 1 Drawing Sheet

(56) References Cited

U.S. PATENT DOCUMENTS

| | | | | |
|---|---|---|---|---|
| 2005/0218885 A1* | 10/2005 | Kozaki | .................. | G01B 7/144 |
| | | | | 324/207.11 |
| 2010/0072939 A1* | 3/2010 | Liu | ...................... | G01D 5/2451 |
| | | | | 318/656 |
| 2011/0227556 A1* | 9/2011 | Ivchenko | ............. | G01C 25/005 |
| | | | | 323/318 |
| 2012/0256773 A1* | 10/2012 | Takahashi | ............ | G01D 5/2046 |
| | | | | 341/118 |
| 2013/0335068 A1* | 12/2013 | Dwyer | ................... | G01D 5/147 |
| | | | | 324/207.11 |
| 2014/0285186 A1* | 9/2014 | Stusak | ..................... | G01B 7/30 |
| | | | | 324/207.17 |
| 2016/0131503 A1* | 5/2016 | Goto | ..................... | G01B 7/003 |
| | | | | 324/207.17 |

\* cited by examiner

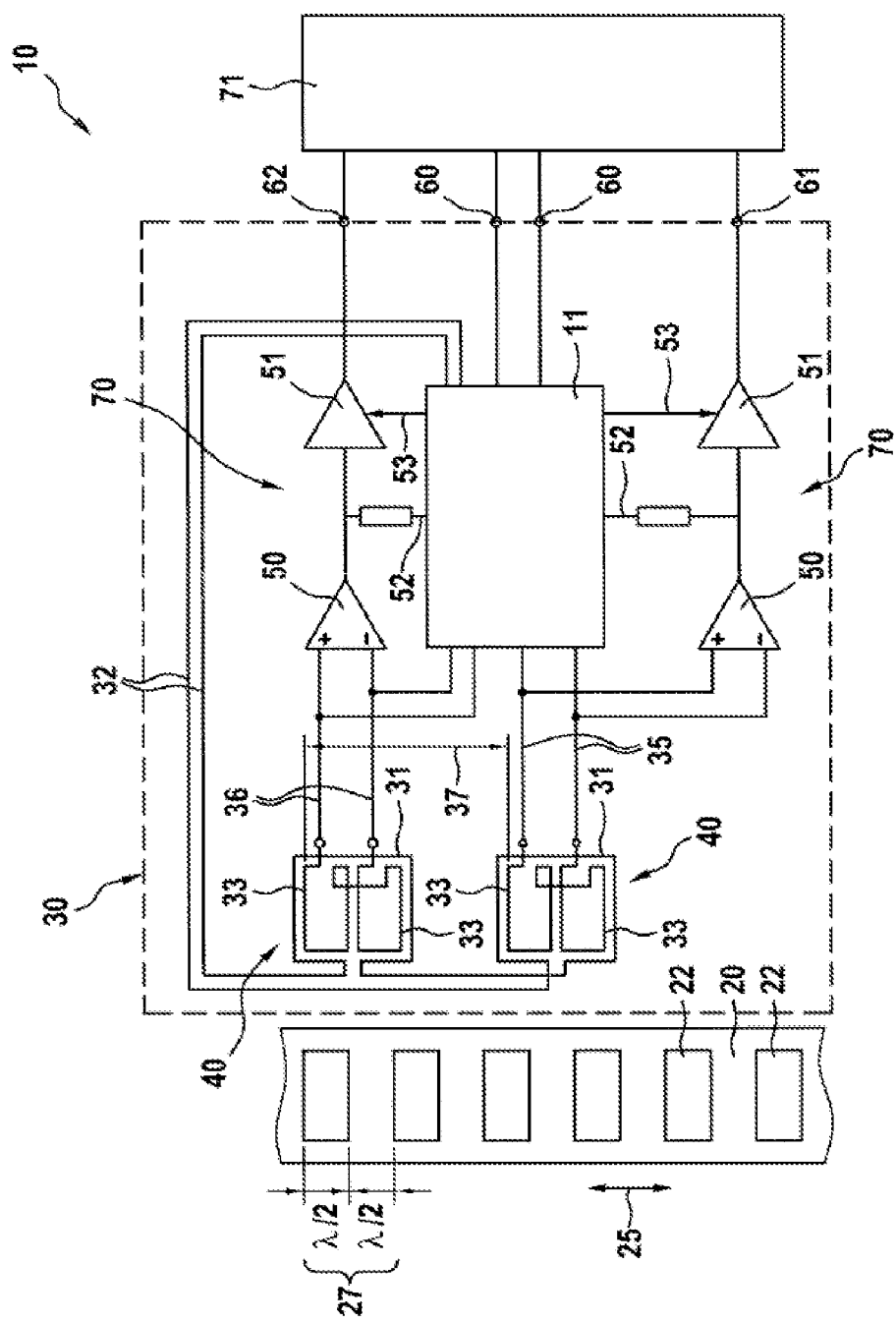

SAFE POSITION MEASURING APPARATUS

This application claims priority under 35 U.S.C. § 119 to patent application no. DE 10 2013 226 198.5 filed on Dec. 17, 2013 in Germany, the disclosure of which is incorporated herein by reference in its entirety.

The disclosure relates to a scanning head for scanning a material measure and to a position measuring apparatus having such a scanning head and a material measure.

BACKGROUND

The topic of safety is becoming increasingly important in machine and installation construction. Accordingly, the demands imposed on safety standards which need to be complied with and are used for personal protection but increasingly also to protect material assets and the environment are also increasing.

The aim of functional safety is to minimize or eliminate risks which can arise both during undisturbed and during disturbed operation of machines or installations. Some previously known techniques primarily achieve this by means of redundant systems. Moving axes in safety-oriented applications therefore require redundant position information in order to be able to perform corresponding safety functions. Different system configurations can be implemented in order to obtain independent position values. One possibility is to use two measuring devices per axis. However, a solution with only one position measuring device is strived for in many cases for reasons of cost. Such position measuring devices can produce so-called sine/cosine signals by scanning a material measure having markings arranged periodically in the measuring direction using sensors which are spaced apart.

U.S. Pat. No. 6,295,992 B1 discloses a position measuring system in which sine and cosine signals are produced and evaluated by scanning a material measure. The sine and cosine signals may be preprocessed in order to improve the measurement result.

It is desirable to specify a measuring apparatus for positions and/or speeds which is functionally safe and nevertheless provides measured values which are as accurate as possible.

SUMMARY

Therefore, a purpose of the disclosure is to provide a scanning head for scanning a material measure and a position measuring apparatus having such a scanning head and a material measure having the features of the independent patent claims. The subclaims and the following description relate to advantageous refinements.

This object is achieved by the subject matter as described below. Advantageous embodiments are described below.

A scanning head according to the disclosure is set up to output two different types of output signals and thus allows, on the one hand, the safe measurement and, on the other hand, the accurate measurement of positions and/or speeds (position change per time). The essence of the disclosure is a combination of analog signal processing for providing the functional safety and digital signal processing for increasing the measurement accuracy.

For this purpose, the scanning head has at least two individual sensors for producing sensor signals. The at least two individual sensors are at a distance from one another in the measuring direction, the distance preferably being a multiple supplemented with a fraction, in particular a quarter, of the period in order to produce the known sine and cosine signals. The at least two different types of output signals are produced from the sensor signals and are output to a superordinate evaluation unit, for example a PLC or a drive controller.

On the one hand, the sensor signals are each individually processed (amplification, demodulation, amplitude/offset control) in the scanning head and are output as safe output signals at a first output of the scanning head. From there, they may be transmitted to the superordinate evaluation unit for evaluation, here for assessing the functional safety, in particular. However, these safe output signals are tied to the period of the scanned material measure, with respect to the resolution, since digital conditioning is not permissible here for safety-oriented reasons. Therefore, the safe output signals are expediently primarily or exclusively used for the safety function.

On the other hand, the sensor signals are digitally processed and conditioned in the scanning head and are output as a highly accurate output signal at a second output of the scanning head. From there, they can be transmitted to the superordinate evaluation unit for evaluation, here for determining the position and/or speed of the scanning head relative to the material measure, in particular. These highly accurate output signals are not tied to the period of the scanned material measure, with respect to the resolution, since digital conditioning is permissible. Therefore, the highly accurate output signals are expediently primarily or exclusively used for the position or speed function.

The safe output signals are preferably analog signals (for example sine and cosine signals), and the highly accurate output signals may be analog signals (sine, cosine, TTL) or digitally coded signals.

At least one signal conditioning unit is advantageously provided downstream of the individual sensors in the signal path in the scanning head. The sensor signals can therefore be conditioned or processed, in particular in an analog manner, without impairing the functional safety. A demodulator and/or an amplifier, in particular, can be used for this purpose. A higher signal quality can therefore be ensured.

An inductive position measuring apparatus operating according to the transformer principle is preferably involved. In this case, an energized excitation structure produces a magnetic alternating field which can be detected by a (generally DC-isolated) receiver structure. If the distribution of the magnetic field is externally influenced, for example by the presence of magnetically or electrically conductive materials, this affects the measurable voltage of the receiver coil according to the law of induction. This principle enables contactless inductive measurement. The inductive measurement initially has a strong offset owing to the principle. This is because only the signal component around which the received signal fluctuates—modulated by the external influences—can be referred to as the useful signal. The proportion of the useful signal is typically only approximately 1% to a maximum of 10% of the overall signal. The remaining signal is offset and is generally undesirable. A differential structure can be selected in order to eliminate offset. For example, two receiver turns may respectively form a differential pair. The two turns are connected in series with an opposite winding sense, with the result that only the difference between the two coil signals is maintained as a measurable signal; an offset is eliminated. Instead of a differential receiver coil, it is likewise conceivable to make the transmitter coil differential in order to achieve freedom from offset. As a result, the magnetic alternating field already has a differential effect on the receiver coil. The reception signal from a receiver coil is therefore free from offset.

It is advantageous if each individual sensor has two receiver coils which are arranged beside one another in the measuring direction and are connected in a differential manner, as well as a transmitter coil assigned to the receiver coils. This makes it possible to effectively detect the markings on the material measure which is formed, in particular, from a ferromagnetic material since the offset of the signal obtained in this manner is compensated for by the receiver coils connected in a differential manner.

However, the position measuring apparatus may operate according to another principle, for example in an optical manner (the sensor system comprises photodiodes, in particular) or in a magnetic manner (the sensor system comprises Hall sensors or magnetoresistive sensors, in particular).

In a method according to the disclosure for operating a position measuring apparatus, in particular a position measuring apparatus according to the disclosure, individual sensors of a sensor scan a material measure and each produce an analog sensor signal. The two different types of output signals are produced from the analog sensor signals and can be used to determine a position and/or speed in a highly accurate manner and to test functional safety. This enables increased accuracy when determining the position using the highly accurate output signal and, at the same time, makes it possible to provide functional safety using the safe output signal.

Further advantages and refinements of the disclosure emerge from the description and the accompanying drawing.

It goes without saying that the features mentioned above and the features yet to be explained below can be used not only in the respectively stated combination but also in other combinations or alone without departing from the scope of the present disclosure.

BRIEF DESCRIPTION OF THE DRAWINGS

The disclosure is schematically illustrated using an exemplary embodiment in the drawing and is described in detail below with reference to the drawing.

FIG. 1 schematically shows a position measuring apparatus according to the disclosure in a preferred refinement.

DETAILED DESCRIPTION

In the exemplary embodiments and in the figure, identical or identically acting parts are each provided with the same reference symbols. The elements illustrated here should not be considered as being true to scale, but rather individual elements may be illustrated on an excessively large scale for the sake of better understanding.

FIG. 1 schematically illustrates a position measuring apparatus 10 in a preferred refinement. In the example shown, the position measuring apparatus 10 is in the form of an inductive measuring apparatus and comprises a scanning head 30 and a material measure 20 (illustrated on the left in FIG. 1) on which markings 22 are formed in the measuring direction 25. The markings 22 have a period 27, the length of a marking being)$\lambda/2$, as is the length of a web between two markings 22. The period 27 is therefore precisely $\lambda$. The material measure 20 is produced from a ferromagnetic sheet metal strip, for example. The markings 22 are simply rectangular holes or apertures in the sheet metal strip, for example.

The scanning head 30 is designed to scan the material measure 20 and is movably mounted with respect to the material measure 20 in order to scan the latter. The scanning head 30 comprises two individual sensors 40, each of the individual sensors 40 in turn consisting of two receiver coils 33 which are interconnected in a differential manner. The two receiver coils 33 are surrounded by a transmitter coil 31 or the latter is assigned to said receiver coils.

The two receiver coils 33 for each individual coil 40 are arranged beside one another in the measuring direction 25. The two individual coils 40 are at a distance 37 from one another which is a multiple of the period 27 supplemented with a fraction of the period 27; the fraction is preferably a quarter, by way of example. In the present case, the distance 37 corresponds to 2¼ of the period 27, that is to say 2.25$\lambda$. The length of a receiver coil 33 is substantially $\lambda/2$ and precisely one marking can therefore be covered thereby.

The drawing also illustrates a digital signal processing apparatus 11 which is connected to the transmitter coils 31 which are connected in series. The digital signal processing apparatus 11 usually comprises A/D converters and FPGAs. During operation of the position measuring apparatus, a transmitter alternating current 32 (for example 100 kHz) is fed into the transmitter coils 31 and causes effective circulating currents in the transmitter coils 31. These currents each induce an AC voltage in the receiver coils 33. If a material measure 20 without markings (no holes, only ferromagnetic metal) were present, the magnitudes of these AC voltages would be the same but with an opposite sign, with the result that they would exactly cancel each other out. This effect is referred to as compensation. If this were dispensed with, the voltage at an individual sensor 40 would fluctuate, depending on a marking, by a signal offset, the magnitude of which is possibly greater than the fluctuations in the signal which are caused by the markings. This would make it considerably more difficult to evaluate the signals.

However, if a receiver coil 33 is above a marking 22, the field produced by the transmitter coil 31 is influenced. If the receiver coils 31 arranged beside one another are influenced differently, a sensor signal is therefore produced, from which the position with respect to a marking can be inferred.

If the scanning head 30 is moved with respect to the material measure 20, a sensor signal is to respectively produced in the individual sensors 40 or in their receiver coils 33, which sensor signal depends on the current position of the individual sensors 40 with respect to the markings 20. An analog cosine signal 36 is produced in one of the individual sensors 40, for example. Since the other individual sensor 40 is arranged in a manner offset by 2.25$\lambda$, in the measuring direction, the sensor signal produced there corresponds to an analog sine signal 35 and there is a phase shift of $\lambda/4$.

The receiver coils 33 are connected to the digital signal processing apparatus 11, that is to say the two sensor signals 35, 36 are passed to this digital signal processing apparatus 11. Suitable means are used to produce at least one digitally conditioned output signal from the two sensor signals 35, 36, which output signal provides more accurate position and/or speed information, for example with a signal period of 40 µm, than that provided by the two original sensor signals 35, 36 which have a signal period of 1 mm, for example. This at least one digitally conditioned output signal is output at at least one output 60. In the present example, a sine signal and a cosine signal are output as highly accurate output signals at the two outputs 60 and, from there, are made available to an evaluation unit 71, for example a PLC or a drive controller. The position and/or speed information is evaluated or further processed in the evaluation unit 71.

In addition, the sensor signals, the analog cosine signal 36 and the analog sine signal 35, are also guided past the digital signal processing apparatus 11 via an analog signal conditioning unit 70 and are provided as safe output signals for the evaluation unit 71 at a respective output 61, 62. For this purpose, each of the individual sensors 40 or its two receiver coils 33 is/are connected to an analog demodulator 50. Each demodulated sensor signal is then supplied to the output 61 or 62 and therefore to the evaluation unit 71 via an analog amplifier 51.

According to the example illustrated, each demodulated signal is additionally supplied, as an analog offset signal 52, to the digital signal processing apparatus 11 in which an analog gain factor 53 is determined therefrom, which gain factor is in turn supplied to the analog amplifier 51. Alternatively, autonomous digital offset control could also be provided. Downstream of the amplifier 51, the signal is therefore a cosine signal or a sine signal which has been conditioned in an analog manner.

The signals which have been conditioned in an analog manner are the safe output signals and, although having lower positional accuracy than the digitally conditioned signals, can be used to ensure the provision of functional safety. The digitally conditioned signals can be used to provide highly accurate position and/or speed information.

LIST OF REFERENCE SYMBOLS

- 10 Position measuring apparatus
- 11 Digital signal processing apparatus
- 20 Material measure
- 22 Marking
- 25 Measuring direction
- 27 First distance
- 30 Scanning head
- 31 Transmitter coil
- 32 Transmitter alternating current
- 33 Receiver coil
- 35 Analog sine signal
- 36 Analog cosine signal
- 37 Second distance
- 50 Analog demodulator
- 51 Analog amplifier
- 52 Analog offset signal
- 53 Analog gain factor
- 60 Digital signal
- 61 Sine signal conditioned in an analog manner
- 62 Cosine signal conditioned in an analog manner
- 70 Signal conditioning unit
- 71 Evaluation unit

What is claimed is:

1. A scanning head for scanning a material measure on which markings with a period are formed periodically in a measuring direction, comprising:
    at least two individual sensors configured to produce sensor signals by scanning the markings;
    a digital signal processing apparatus connected to each of the at least two individual sensors, the digital signal processing apparatus configured to (i) receive the sensor signals from the at least two individual sensors and (ii) produce at least one digitally conditioned output signal based on the sensor signals using digital signal processing;
    at least one analog signal conditioning unit connected to at least one of the at least two individual sensors and including at least a signal amplifier and a signal demodulator, the at least one analog signal conditioning unit configured to (i) receive at least one of the sensor signals from the at least one of at least two individual sensors and (ii) produce at least one analog conditioned output signal based on the at least one of the sensor signals using analog signal processing;
    at least one digital output configured to connect to an evaluation unit, the at least one digitally conditioned output signal being outputted at the at least one digital output; and
    at least one analog output configured to connect to the evaluation unit, the at least one analog conditioned output signal being outputted at the at least one analog output,
    wherein the digital signal processing apparatus is connected to the signal demodulator and the signal amplifier and is configured to (i) receive an offset signal from the signal demodulator, (ii) identify a gain factor for operation of the signal amplifier using the offset signal, and (iii) adjust the signal amplifier to operate with the gain factor.

2. The scanning head according to claim 1, wherein the at least one analog conditioned output signal is not produced with digital signal processing.

3. The scanning head according to claim 1, wherein each of the at least two individual sensors includes two receiver coils and the two receiver coils are arranged beside one another in the measuring direction and connected in a differential manner.

4. The scanning head according to claim 1, wherein each of the at least two individual sensors has a transmitter coil.

5. A position measuring apparatus, comprising:
    a material measure on which markings are formed periodically in a measuring direction; and
    a scanning head including:
        at least two individual sensors configured to produce sensor signals by scanning the markings;
        a digital signal processing apparatus connected to each of the at least two individual sensors, the digital signal processing apparatus configured to (i) receive the sensor signals from the at least two individual sensors and (ii) produce at least one digitally conditioned output signal based on the sensor signals using digital signal processing;
        at least one analog signal conditioning unit connected to at least one of the at least two individual sensors and including at least a signal amplifier and a signal demodulator, the at least one analog signal conditioning unit configured to (i) receive at least one of the sensor signals from the at least one of at least two individual sensors and (ii) produce at least one analog conditioned output signal based on the at least one of the sensor signals using analog signal processing;
        at least one digital output configured to connect to an evaluation unit, the at least one digitally conditioned output signal being outputted at the at least one digital output; and
        at least one analog output configured to connect to the evaluation unit, the at least one analog conditioned output signal being outputted at the at least one analog output,
        wherein the digital signal processing apparatus connected to the signal demodulator and the signal amplifier and is configured to (i) receive an offset signal from the signal demodulator, (ii) identify a gain factor for operation of the signal amplifier using the offset signal, and (iii) adjust the signal amplifier to operate with the gain factor.

6. The position measuring apparatus according to claim 5, wherein the at least two individual sensors are at a distance from one another in the measuring direction and the distance is a multiple supplemented with a fraction of a period of the periodically formed markings.

7. The position measuring apparatus according to claim 6, wherein the fraction is a quarter.

* * * * *